United States Patent
Wakamatsu

(10) Patent No.: US 11,924,552 B2
(45) Date of Patent: Mar. 5, 2024

(54) IMAGE PICKUP APPARATUS THAT DRIVES MOVABLE UNIT SO AS TO BE DISPLACED RELATIVELY TO FIXED UNIT, ELECTRONIC APPARATUS THAT DRIVES MOVABLE UNIT SO AS TO BE DISPLACED RELATIVELY TO FIXED UNIT, AND CONTROL METHODS THEREFOR

(71) Applicant: CANON KABUSHIKI KAISHA, Tokyo (JP)

(72) Inventor: Nobushige Wakamatsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/535,379

(22) Filed: Nov. 24, 2021

(65) Prior Publication Data
US 2022/0174199 A1    Jun. 2, 2022

(30) Foreign Application Priority Data
Nov. 30, 2020    (JP) ................................. 2020-198082

(51) Int. Cl.
*H04N 23/695* (2023.01)
*H04N 23/611* (2023.01)
(Continued)

(52) U.S. Cl.
CPC ......... *H04N 23/695* (2023.01); *H04N 23/611* (2023.01); *H04N 23/661* (2023.01); *H04N 23/6812* (2023.01); *H04N 23/687* (2023.01)

(58) Field of Classification Search
CPC .. H04N 5/2259; H04N 5/232; H04N 5/23203; H04N 5/23206; H04N 5/23209;
(Continued)

(56) References Cited

U.S. PATENT DOCUMENTS

2008/0246847 A1    10/2008 Suda
2009/0087172 A1    4/2009 Nakazawa et al.
(Continued)

FOREIGN PATENT DOCUMENTS

| CN | 111787200 A | * 10/2020 | ........... H04N 5/2251 |
|----|-------------|-----------|------------------------|
| JP | 2008-116836 A | 5/2008 | |
| JP | 2019-106694 A | 6/2019 | |

OTHER PUBLICATIONS

The above U.S. patent documents were cited in a European Search Report dated Apr. 25, 2022, which is enclosed, that issued in the corresponding European Patent Application No. 21209779.4.

*Primary Examiner* — Paul M Berardesca
(74) *Attorney, Agent, or Firm* — Cowan, Liebowitz & Latman, P.C.

(57) ABSTRACT

An image pickup apparatus capable of judging that the image pickup apparatus has fallen down unintentionally is provided. The image pickup apparatus comprising a movable unit having an image pickup unit, a fixed unit configured to support the movable unit in a manner being relatively displaceable, a drive unit configured to drive the movable unit so as to be displaced relatively to the fixed unit, a first detector configured to detect an inclination angle of the image pickup apparatus, a second detector configured to detect movement of the image pickup apparatus, and a control unit configured to perform control at the time of falling down of the image pickup apparatus in accordance with the inclination angle detected by first detector and frequency information and amplitude information of the movement detected by the second detector.

16 Claims, 11 Drawing Sheets

(51) Int. Cl.
*H04N 23/661* (2023.01)
*H04N 23/68* (2023.01)

(58) Field of Classification Search
CPC . H04N 5/23248–2329; H04N 5/23299; H04N 23/58; H04N 23/66–63; H04N 23/68–689; H04N 23/695; H04N 7/18; H04N 7/183–188; H04N 23/611; G03B 5/02; G03B 2205/00–0084; G02B 27/64; G02B 27/646; G08B 13/196–19697
See application file for complete search history.

(56) References Cited

U.S. PATENT DOCUMENTS

| | | | |
|---|---|---|---|
| 2009/0109303 A1* | 4/2009 | Ito | G11B 19/043 |
| | | | 348/231.9 |
| 2012/0157073 A1* | 6/2012 | Kim | H04M 1/72403 |
| | | | 455/418 |
| 2014/0172316 A1* | 6/2014 | Vandersleen | A61B 5/14535 |
| | | | 702/19 |
| 2015/0195926 A1* | 7/2015 | Kandur Raja | H04N 23/45 |
| | | | 361/679.21 |
| 2017/0047960 A1* | 2/2017 | Kil | H04W 4/80 |
| 2017/0163899 A1 | 6/2017 | Irie et al. | |
| 2018/0027208 A1* | 1/2018 | Sardar | H04N 23/62 |
| | | | 348/231.99 |
| 2018/0082144 A1* | 3/2018 | Wakamatsu | H04N 23/695 |
| 2020/0177801 A1 | 6/2020 | Tada | |
| 2021/0250509 A1* | 8/2021 | Kim | G02B 27/646 |

* cited by examiner

IMAGE PICKUP APPARATUS THAT DRIVES MOVABLE UNIT SO AS TO BE DISPLACED RELATIVELY TO FIXED UNIT, ELECTRONIC APPARATUS THAT DRIVES MOVABLE UNIT SO AS TO BE DISPLACED RELATIVELY TO FIXED UNIT, AND CONTROL METHODS THEREFOR

BACKGROUND OF THE INVENTION

Field of the Invention

The present invention relates to an image pickup apparatus that drives a movable unit so as to be displaced relatively to a fixed unit, an electronic apparatus that drives a movable unit so as to be displaced relatively to a fixed unit, and control methods therefor.

Description of the Related Art

Conventionally, an image pickup apparatus is known as an electronic apparatus that drives a movable unit so as to be displaced relatively to a fixed unit. For example, in the image pickup apparatus such as a digital camera, there is an image pickup apparatus capable of rotationally driving in a pan direction of the camera and in a tilt direction of the camera for subject search or the like. In such an image pickup apparatus, it is possible to detect a person by a face detection function or a human body detection function that detects a face or a body of a person included in a subject, and perform a focusing control, an exposure control, or a subject tracking by pan and tilt rotation in accordance with information of the detected person.

Automatic subject search by a pan and tilt rotating mechanism, an automatic tracking device, and an image pickup apparatus that performs automatic photographing are disclosed in Japanese Laid-Open Patent Publication (kokai) No. 2019-106694. In addition, some conventional image pickup apparatuses are equipped with an image shake correction device. For example, it is possible for the image shake correction device to suppress an image shake of an image on an image plane by moving lenses and an image pickup element on a plane perpendicular to an optical axis in accordance with the amount of camera shake, and perform an image shake correction by rotationally driving a lens barrel including a photographing optical system and the image pickup element.

An image pickup apparatus, which has a rotating unit (the movable unit) that holds the lens barrel including the photographing optical system and the image pickup element, a main body unit (the fixed unit) that holds the rotating unit so that the lens barrel can rotate in at least two axial directions, and a shake detecting unit that is disposed on the main body unit and detects rotational shakes in three axial directions, is disclosed in Japanese Laid-Open Patent Publication (kokai) No. 2008-116836. This image pickup apparatus calculates a target value for a shake correction on the basis of the rotational shakes detected by the shake detecting unit and a relative angle between the main body unit and the rotating unit, and performs the shake correction by rotationally driving the rotating unit in accordance with the target value.

However, in the case of driving the movable unit so as to be automatically displaced relatively to the fixed unit, the following problems occur. At first, in the case of automatically searching, tracking, and photographing the subject, it is often the case that the camera is installed at a position away from a user to photograph. For example, in the case that a child or pet pushes over the camera or the camera falls down due to wind or the like, if the user is away from the camera, the user may not be aware for a long time that the camera has fallen down.

When the camera, which is in a fallen-down state, performs the automatic search and the tracking by using the pan and tilt rotating mechanism, or drives the rotating mechanism by image stabilization control, the camera may roll if it is driven in a state that the movable unit is in contact with an installation surface, on which the camera has fallen down. If the camera rolls, there is a risk that the camera falls off a desk and breaks down. In addition, the rotating mechanism may not be properly driven to a target position due to a friction or a resistance with the installation surface, on which the camera has fallen down, and a driving force with high torque and high output may continue to be generated. In such a case, there is also a risk that the rotating mechanism breaks down or power is wasted.

Also, considering a case that the camera is installed and used in a state that it is tilted with respect to a gravity direction, and a case that the camera is used by hand, it is difficult to judge whether or not the camera is in the fallen-down state by using only tilt information of the camera.

SUMMARY OF THE INVENTION

The present invention provides an image pickup apparatus capable of judging that the image pickup apparatus has fallen down unintentionally, an electronic apparatus capable of judging that the electronic apparatus has fallen down unintentionally, and control methods therefor.

Accordingly, the present invention provides an image pickup apparatus comprising a movable unit having an image pickup unit, a fixed unit configured to support the movable unit in a manner being relatively displaceable, a drive unit configured to drive the movable unit so as to be displaced relatively to the fixed unit, a first detector configured to detect an inclination angle of the image pickup apparatus, a second detector configured to detect movement of the image pickup apparatus, and a control unit configured to perform control at the time of falling down of the image pickup apparatus in accordance with the inclination angle detected by first detector and frequency information and amplitude information of the movement detected by the second detector.

According to the present invention, it is possible to judge that the apparatus has fallen down unintentionally.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1A:
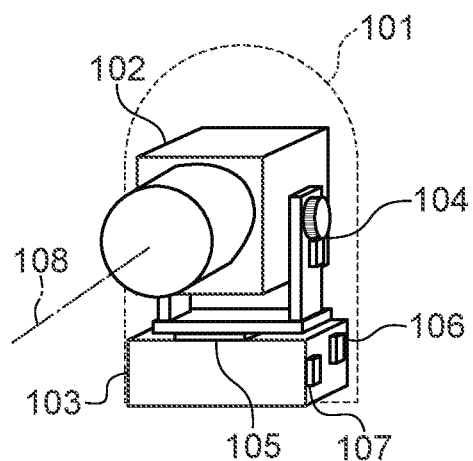
FIGS. 1A, 1B and 1C are schematic perspective views that show an image pickup apparatus.
Figure 1A:
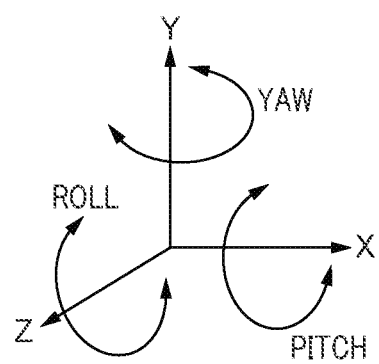

FIG. 1A is a schematic perspective view that shows an image pickup apparatus according to an embodiment of the present invention. Although this image pickup apparatus is configured as, for example, a camera 101 capable of picking up still images, this image pickup apparatus (the camera 101) may also be capable of picking up moving images. The camera 101 has a fixed unit 103 that is a camera body and a lens barrel 102 that is a lens barrel. The lens barrel 102 includes photographing lens groups and an image pickup element. An optical axis 108 is an image pickup optical axis of an image pickup optical system in the lens barrel 102. An angular velocity meter 106 and an accelerometer 107 are mounted on the fixed unit 103. The camera 101 is provided with various operation members such as a power switch.

The fixed unit 103 supports the lens barrel 102 as a movable unit in a manner being relatively displaceable. Specifically, the lens barrel 102 is connected to the fixed unit 103 via a tilt rotating unit 104 and a pan rotating unit 105. The tilt rotating unit 104 and the pan rotating unit 105 are collectively referred to as "a pan and tilt rotating mechanism". Hereinafter, as three axial directions, rotation directions around an X-axis, a Y-axis, and a Z-axis, which are shown in FIG. 1A, are defined as a pitch direction, a yaw direction, and a roll direction, respectively.

Figure 1B:
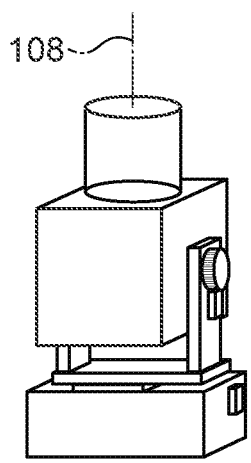
Figure 1C:
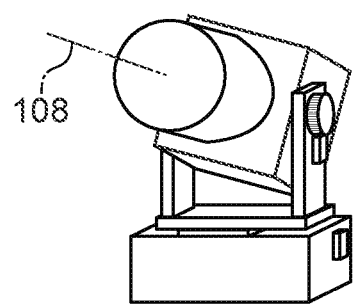

The tilt rotating unit 104 is a motor drive mechanism that rotationally drives the lens barrel 102 in the pitch direction. The pan rotating unit 105 is a motor drive mechanism that rotationally drives the lens barrel 102 in the yaw direction. FIGS. 1B and 1C show how the lens barrel 102 is rotated to tilt. The camera 101 detects a shake state of the camera 101 on the basis of detection results that are obtained by the angular velocity meter 106 and the accelerometer 107, and drive-controls the tilt rotating unit 104 and the pan rotating unit 105 on the basis of the detected shaking angle. This makes it possible to correct the shake of the lens barrel 102, which is the movable unit, and to correct the tilt of the lens barrel 102.

Figure 2:
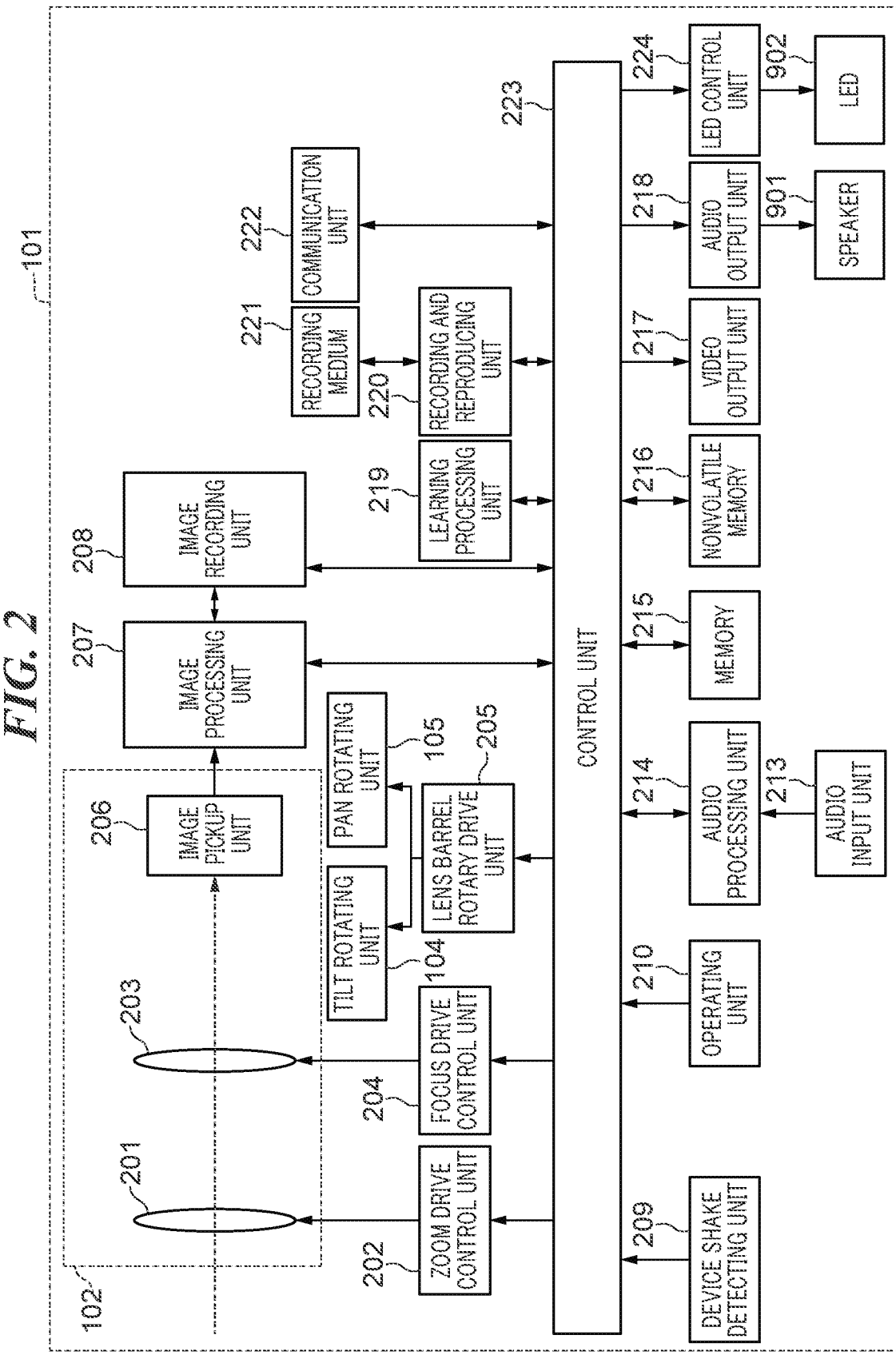
FIG. 2 is a block diagram that shows a camera.

FIG. 2 is a block diagram that shows the camera 101. In the lens barrel 102, a zoom unit 201 includes a zoom lens that performs zooming. A zoom drive control unit 202 drive-controls the zoom unit 201. A focus unit 203 includes a lens that performs focus adjustment. A focus drive control unit 204 drive-controls the focus unit 203. An image pickup unit 206 includes the image pickup element, and the image pickup element receives light incident through each lens group and generates information about charge corresponding to a light quantity of the light as analog image data. This analog image data is outputted to an image processing unit 207.

In the fixed unit 103, a control unit 223 has, for example, a CPU (Central Processing Unit) (a MPU (Micro Processor Unit)), a memory (a DRAM (Dynamic Random Access Memory), or an SRAM (Static Random Access Memory)), a nonvolatile memory (an EEPROM (Electrically Erasable Programmable Read-Only Memory), and the like. The control unit 223 executes various processes (programs) so as to control each block of the camera 101 and control data transfer between the blocks. A nonvolatile memory 216 is a memory that can be electrically erased and recorded, and stores constants, programs, and the like for the operation of the control unit 223.

The image processing unit 207 converts the analog image data, which is inputted from the image pickup unit 206, into digital image data by means of an A/D conversion. The image processing unit 207 applies image processing such as a distortion correction, a white balance adjustment, and a color interpolation processing to the digital image data, and outputs the image processing-applied digital image data. The digital image data, which is outputted from the image processing unit 207, is converted into a recording format such as a JPEG format by an image recording unit 208, and then is transmitted to a memory 215 and a video output unit 217.

A lens barrel rotary drive unit 205 is a drive unit for driving the tilt rotating unit 104 and the pan rotating unit 105, and rotationally drives the lens barrel 102 in the tilt direction and in the pan direction. The lens barrel rotary drive unit 205 is drive-controlled by the control unit 223. A device shake detecting unit 209 includes the angular velocity meter 106 and the accelerometer 107 (FIG. 1A). The angular velocity meter 106 is configured by a gyro sensor, etc., and detects angular velocities of the three axial directions of the camera 101. The angular velocity meter 106 functions as a second detector. The accelerometer 107 is configured by an acceleration sensor, etc., and detects accelerations of the three axial directions of the camera 101. A rotation angle of the camera 101, a shift amount of the camera 101, etc. are calculated based on detection signals, which are outputted from the angular velocity meter 106 and the accelerometer 107.

An operating unit 210 can be operated by a user, and includes a power button and buttons capable of changing settings of the camera. When the power button is operated, power is supplied to the entire camera 101 according to the purpose of use, and the camera 101 is activated. An audio input unit 213 obtains audio signals around the camera 101 from a microphone provided in the camera 101, performs an analog-to-digital conversion with respect to the obtained audio signals, and then transmits it to an audio processing unit 214. The audio processing unit 214 performs audio-related processing such as an optimization processing of the inputted digital audio signals. And then, the audio signals, which are processed by the audio processing unit 214, are transmitted to the memory 215 by the control unit 223. The memory 215 temporarily stores image signals obtained by the image processing unit 207 and the audio signals obtained by the audio processing unit 214.

The image processing unit 207 reads out the image signals that are temporarily stored in the memory 215, encodes the image signals, and generates compressed image signals. Further, the audio processing unit 214 reads out the audio signals that are temporarily stored in the memory 215, encodes the audio signals, and generates compressed audio signals. The control unit 223 transmits the compressed image signals and the compressed audio signals to a recording and reproducing unit 220.

The recording and reproducing unit 220 records the compressed image signals generated by the image processing unit 207, the compressed audio signals generated by the audio processing unit 214, and other control data, etc., which are related to photographing, on a recording medium 221. Further, in the case that the audio signals are not compression-encoded, the control unit 223 transmits the audio signals generated by the audio processing unit 214 and the compressed image signals generated by the image processing unit 207 to the recording and reproducing unit 220, and then causes the recording and reproducing unit 220 to record it on the recording medium 221.

Although the recording medium 221 is a recording medium built in the camera 101, the recording medium 221 may be a removable recording medium. It is possible to record various kinds of data generated by the camera 101 such as the compressed image signals, the compressed audio signals, and the audio signals on the recording medium 221. Therefore, a medium having a larger capacity is generally adopted as the recording medium 221 than the nonvolatile memory 216. For example, the recording medium 221 may be any recording medium of a hard disk, an optical disk, an optical magnetic disk, a CD-R (Compact Disc Recordable), a DVD-R (Digital Versatile Disc Recordable), a magnetic tape, a nonvolatile semiconductor memory, a flash memory, etc.

The recording and reproducing unit 220 reads out (reproduces) the compressed image signals, the compressed audio signals, the audio signals, the various kinds of data, and the programs, which are recorded on the recording medium 221. And then, the control unit 223 transmits the compressed image signals that are read out and the compressed audio signals that are read out to the image processing unit 207 and the audio processing unit 214. The image processing unit 207 and the audio processing unit 214 temporarily store the compressed image signals and the compressed audio signals in the memory 215, decode them according to predetermined procedures, and transmit the decoded signals to the video output unit 217.

An audio output unit 218 outputs an audio pattern, which is predetermined for example, at the time of photographing, from a speaker 901. An LED (Light Emitting Diode) control unit 224 controls an LED 902 with a predetermined lighting and blinking pattern, for example, at the time of photographing. The video output unit 217 includes, for example, a video output terminal, and transmits the image signals in order to display the video on a connected external display or the like. Moreover, the audio output unit 218 and the video output unit 217 may include one combined terminal, for example, a terminal such as an HDMI (registered trademark) (High-Definition Multimedia Interface) terminal.

A communication unit 222 performs communications between the camera 101 and an external device, and transmits or receives data such as the audio signals, the image signals, the compressed audio signals, and the compressed image signals. Further, when the camera 101 has detected an abnormal state, the communication unit 222 transmits information for notifying a camera's internal state such as error information to the external device. The communication unit 222 includes, for example, wireless communication modules such as an infrared communication module, a Bluetooth (registered trademark) communication module, a wireless LAN (Local Area Network) communication module, a wireless USB (Universal Serial Bus), and a GPS (Global Positioning System) receiver. In addition, the fixed unit 103 has a learning processing unit 219.

Figure 3:
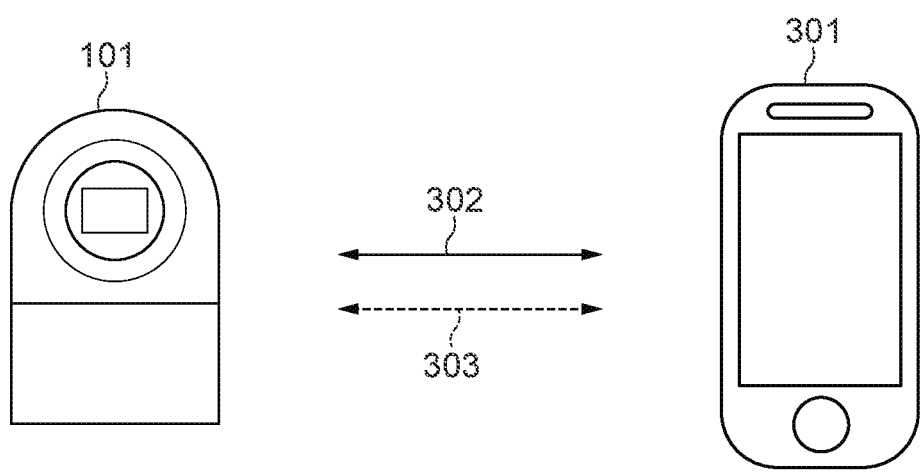
FIG. 3 is a diagram that shows a configuration example of a wireless communication system.

FIG. 3 is a diagram that shows a configuration example of a wireless communication system that has the camera 101 and the external device. The external device is, for example, a smart device 301 that includes a Bluetooth communication module and a wireless LAN communication module.

The camera 101 and the smart device 301 can communicate with each other by a communication 302 and a communication 303. The communication 302 is, for example, a communication by a wireless LAN conforming to the IEEE802.11 standard series. The communication 303 is, for example, a communication having a master-slave relationship between a control station and a subordinate station, such as Bluetooth Low Energy (hereinafter referred to as "BLE").

Moreover, the wireless LAN and the BLE are examples of communication methods, and other communication methods may be used. It may be possible that each of the camera 101 and the smart device 301 have two or more communication functions, and for example, one communication function, which performs communications in a relationship between the control station and the subordinate station, can perform the control of the other communication functions. It is noted that without losing generality, a first communication such as the wireless LAN can perform higher-speed communications than a second communication such as the BLE, and the second communication is at least one of that the second communication consumes less power than the first communication, and that the second communication has a shorter communicable distance than the first communication.

Figure 4:
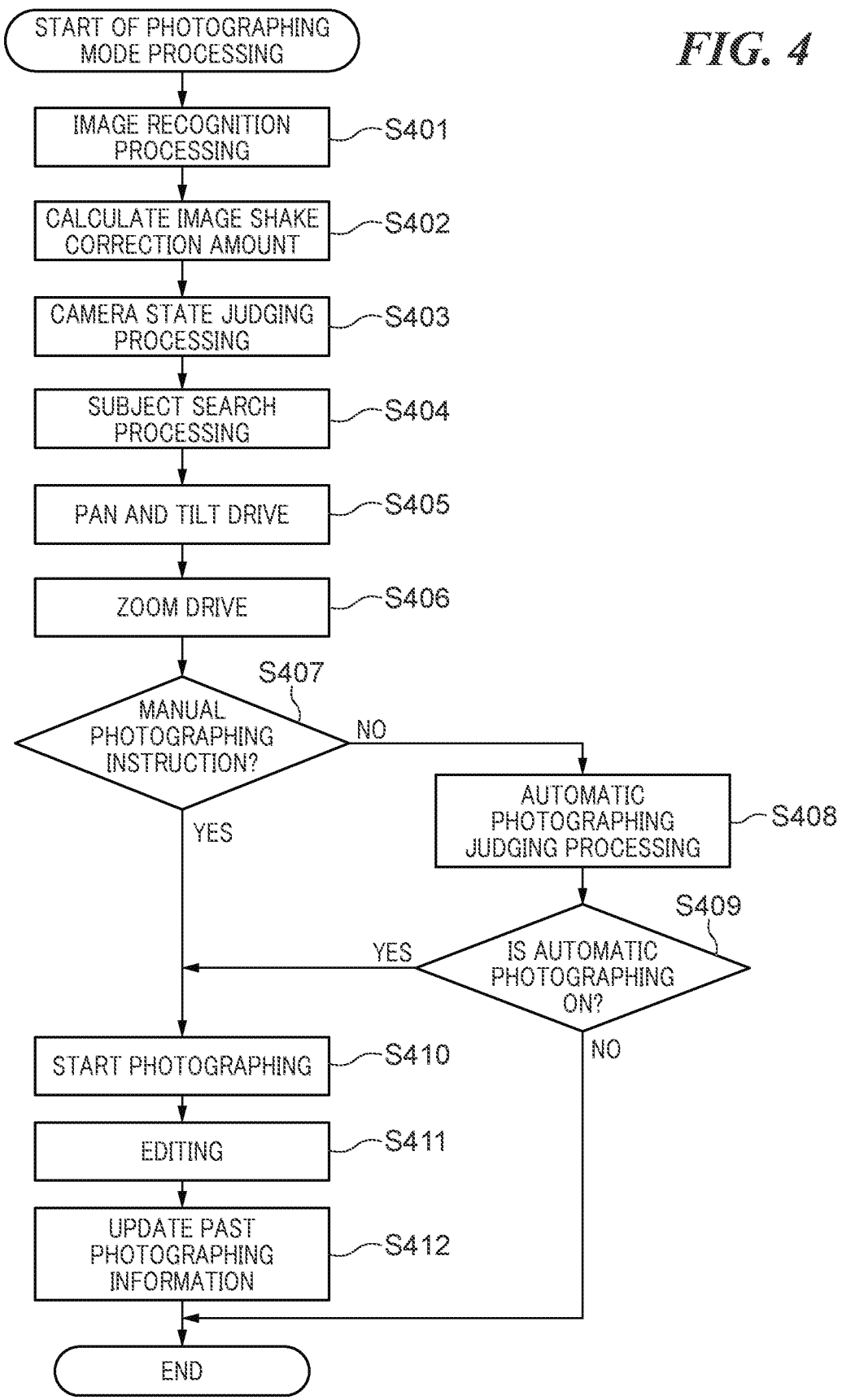
FIG. 4 is a flowchart that shows a photographing mode processing.

FIG. 4 is a flowchart that shows a photographing mode processing. This photographing mode processing is realized by the CPU included in the control unit 223 reading out the program stored in a storage unit such as the ROM included in the control unit 223 and executing it. Further, this photographing mode processing is started when a photographing mode, which automatically performs a panning and tilting drive, such as automatic tracking is set, and is executed at regular time intervals.

In a step S401, the control unit 223 executes an image recognition processing. At first, the control unit 223 generates image data by causing the image processing unit 207 to perform image processing with respect to the signals captured by the image pickup unit 206 for subject detection. And then, the control unit 223, which functions as a subject detecting unit, performs the subject detection such as person detection and object detection based on the generated image data. When the control unit 223 detects a person, the control unit 223 detects the face or the human body of the subject. In a face detection processing, a pattern for judging a face of a person is predetermined, and a portion, which matches the above pattern and is included within a picked-up image, is detected as a face image of the person. At the same time, a reliability, which indicates the certainty of the subject's face, is also calculated. The reliability is calculated based on, for example, the size of a face region within the image, the degree of matching with the face pattern, and the like. Similarly, in object recognition, an object, which matches with a pre-registered pattern, is recognized. The control unit 223 calculates an evaluation value for each image region of the recognized subject, and judges the image region of the subject having the highest evaluation value as a main subject region.

In a step S402, the control unit 223 calculates an image shake correction amount. Specifically, at first, the control unit 223 calculates a shake angle on the basis of angular velocity information and acceleration information that are obtained by the device shake detecting unit 209. Then, the control unit 223 obtains an image stabilization angle, which moves the tilt rotating unit 104 and the pan rotating unit 105 in an angle direction for canceling the shake angle, and sets the image stabilization angle obtained as the image shake correction amount.

In a step S403, the control unit 223 performs a camera state judging processing that judges a camera state. That is, the control unit 223 judges what kind of shake/movement state the camera 101 is currently in, based on a camera angle, a camera moving amount, etc., which are detected from the angular velocity information, the acceleration information, a GPS position information, etc.

For example, in the case of photographing in a state that the camera 101 is installed within a vehicle, subject information such as surrounding landscape changes greatly depending on a distance moved. Here, the control unit 223 judges whether or not the camera 101 is in "a vehicle moving state" that the camera 101 is installed within the vehicle or the like and is moving at a high speed. This can be used in the automatic subject search that will be described later. Further, the control unit 223 judges whether or not the camera 101 is in "a stationary photographing state", in which there is almost no shaking angle of the camera 101, based on the magnitude of the change in the camera angle. In the case that the camera 101 is in "the stationary photographing state", since it can be considered that the angle of the camera 101 itself does not change, the control unit 223 can perform the subject search for stationary photographing. Further, in the case that the change in the camera angle is relatively large, the control unit 223 judges that the camera 101 is in "a hand-held state", and the control unit 223 can perform the subject search for hand-held use.

The camera state, which is judged in the step S403, also includes judging of a falling-down state/a non-falling-down state by falling-down detection. That is, it is also judged whether or not a state of the camera 101 is the falling-down state or the non-falling-down state. The method for judging the falling-down state/the non-falling-down state will be described later.

In a step S404, the control unit 223 executes a subject search processing. When a state, in which a subject to be photographed is not detected, continues for a predetermined time, the control unit 223 judges that there is no subject within an angle of view at a current pan and tilt angle position. Then, in order to search a subject that may be out of the angle of view currently, the control unit 223 calculates a target angle for driving pan and tilt to search the subject. When the subject to be photographed is detected during the search operation, the control unit 223 calculates a target angle for performing tracking control, which holds the said subject at a predetermined position (for example, the center) of the image by the panning and tilting drive. When an automatic photographing operation described later is performed a predetermined number of times, the control unit 223 drives the pan and tilt in order to search a different subject, and calculates a target angle for searching the said different subject.

In a step S405, the control unit 223 executes the panning and tilting drive. Specifically, the control unit 223 calculates a panning and tilting drive amount by adding the image shake correction amount calculated in the step S402 and the panning and tilting search/tracking target angle calculated in the step S404. Then, the control unit 223 drive-controls the tilt rotating unit 104 and the pan rotating unit 105 by the panning and tilting drive amount, respectively, by the lens barrel rotary drive unit 205.

In a step S406, the control unit 223 controls the zoom unit 201 to perform a zoom drive. Specifically, the control unit 223 drives the zoom in accordance with the state of the subject to be searched determined in the step S404. For example, in the case that the subject to be searched is the face of a person, if the face on the image is too small, it will not be detected because it is smaller than a minimum detectable size and there is a risk that it will be lost. In such a case, the control unit 223 controls to increase the size of the face on the image by zooming in a telephoto direction. On the other hand, if the face on the image is too large, the subject tends to deviate from the angle of view due to the movements of the subject and the camera itself. In such a case, the control unit 223 controls to decrease the size of the face on the image by zooming in a wide-angle direction. By performing the zoom control in this way, it is possible to maintain a state suitable for tracking the subject.

In a step S407, the control unit 223 judges whether or not there has been a manual photographing instruction. The manual photographing instruction may be given by pressing a shutter button, by lightly striking (tapping) a camera housing with a finger or the like, or by inputting a voice command, further, the manual photographing instruction may be an instruction from the external device. The photographing instruction by the tap operation is a photographing instruction method that when the user taps the camera housing, the device shake detecting unit 209 detects a continuous high-frequency acceleration in a short period of time and triggers the photographing. The inputting the voice command is a photographing instruction method that when the user uttered a watchword (for example, "take a picture"), which instructs a predetermined photographing, the audio processing unit 214 recognizes the utterance of the user and triggers the photographing. The instruction from the external device is a photographing instruction method that the photographing is triggered by a shutter instruction signal, which is transmitted via a dedicated application from, for example, a smartphone or the like connected to the camera via Bluetooth.

As a result of judging in the step S407, in the case that there has been the manual photographing instruction, the control unit 223 advances the processing to a step S410, and in the case that there is no manual photographing instruction, the control unit 223 advances the processing to a step S408. In the step S408, the control unit 223 executes an automatic photographing judging processing. That is, the control unit 223 judges whether or not to perform the automatic photographing from the detected subject. For example, the control unit 223 detects a specific person subject, and judges to perform the automatic photographing when a facial expression or a pose satisfies a preset condition.

In a step S409, in the case of being judged in the step S408 to perform the automatic photographing, the control unit 223 advances the processing to the step S410, and in the case of not being judged in the step S408 to perform the automatic photographing, the control unit 223 ends the photographing mode processing shown in FIG. 4.

In the step S410, the control unit 223 starts the photographing. At that time, the control unit 223 performs an autofocus control by the focus drive control unit 204. Further, the control unit 223 uses an aperture control unit (not shown), a sensor gain control unit (not shown), and a shutter control unit (not shown) to perform an exposure control so that the subject has an appropriate brightness. Further, after the photographing, the control unit 223 performs various known image processing such as an automatic white balance processing, a noise reduction processing, and a gamma correction processing, by means of the image processing unit 207 to generate an image.

In a step S411, the control unit 223 performs an editing processing such as processing the image generated in the step S410 and adding it to a moving image. Specifically, the image processing referred to here, includes a trimming processing based on a person's face and an in-focus position, an image rotation processing, an HDR (high dynamic range) effect, a blurring effect, a color conversion filter effect, and the like. Moreover, in the image processing, a plurality of images may be generated by a combination of the above processes based on the image generated in the step S410, and may be stored separately from the image generated in the step S410. Further, in a moving image processing, a moving image photographed or a still image photographed may be added to an edited moving image having already been generated while adding special effect processing such as a sliding processing, a zooming processing, and a fading processing.

In a step S412, the control unit 223 updates past photographing information. For example, the control unit 223 sets a count for each of the number of photographed images per person, who is registered for personal authentication and is the subject to be photographed, the number of photographed images per subject that is recognized by general object recognition, and the number of photographed images per scene that is determined by scene determination. Then, the control unit 223 increases the number of counts corresponding to the image photographed this time by one, and uses the updated count value in the subject search processing of the step S404 and judging of the automatic photographing judging processing of the step S408.

Figure 5:
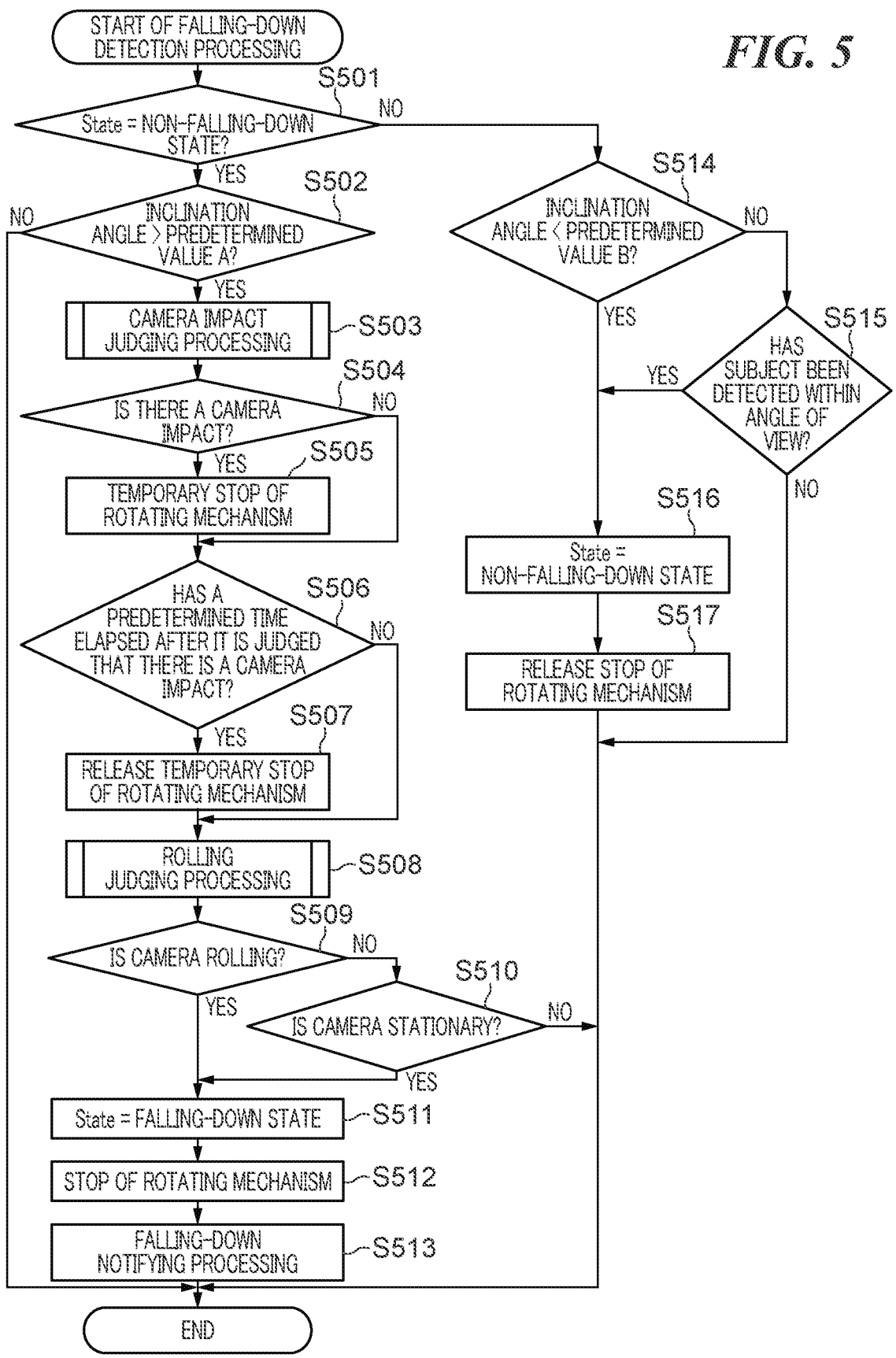
FIG. 5 is a flowchart that shows a falling-down detection processing.

FIG. 5 is a flowchart that shows a falling-down detection processing. This falling-down detection processing is included in the camera state judging processing of the step S403 of FIG. 5. This falling-down detection processing is started by executing the camera state judging processing of the step S403, and is then repeatedly executed at a prescribed period until the processing shown in FIG. 4 is completed. In this falling-down detection processing, the control unit 223 serves as a judging unit and a control unit in the present invention.

In this falling-down detection processing, a state variable "State" is used as a status that indicates the state (a state related to the posture) of the camera 101. The state variable "State" is set to the falling-down state or the non-falling-down state, and an initial value of the state variable "State" is set to the non-falling-down state. In a step S501, the control unit 223 judges whether or not the state variable "State" is set to the non-falling-down state. In the case that the state variable "State" is the non-falling-down state, since the control unit 223 can judge that the camera 101 has not fallen down at present, the control unit 223 advances the processing to a step S502. On the other hand, in the case that the state variable "State" is the falling-down state, since the control unit 223 can judge that the camera 101 has fallen down at present, the control unit 223 advances the processing to a step S514.

In the step S502, the control unit 223 judges whether or not an inclination angle of the camera 101 is larger than a predetermined value A (a first inclination angle). Here, the inclination angle of the camera 101 is defined with a direction perpendicular to the gravity direction as 0 reference. The inclination angle of the camera 101 can be calculated based on output values of a triaxial acceleration sensor of the accelerometer 107 mounted on the fixed unit 103. The accelerometer 107 functions as a first detector. The value of the predetermined value A is in a range, which is larger than 0 degrees and is equal to or less than 180 degrees, and for example, the value of the predetermined value A is 60 degrees. In the case that the inclination angle of the camera 101 exceeds the predetermined value A, the control unit 223 advances the processing to a step S503, and in the case that the inclination angle of the camera 101 is equal to or less than the predetermined value A, the control unit 223 ends the falling-down detection processing shown in FIG. 5.

Figure 6:
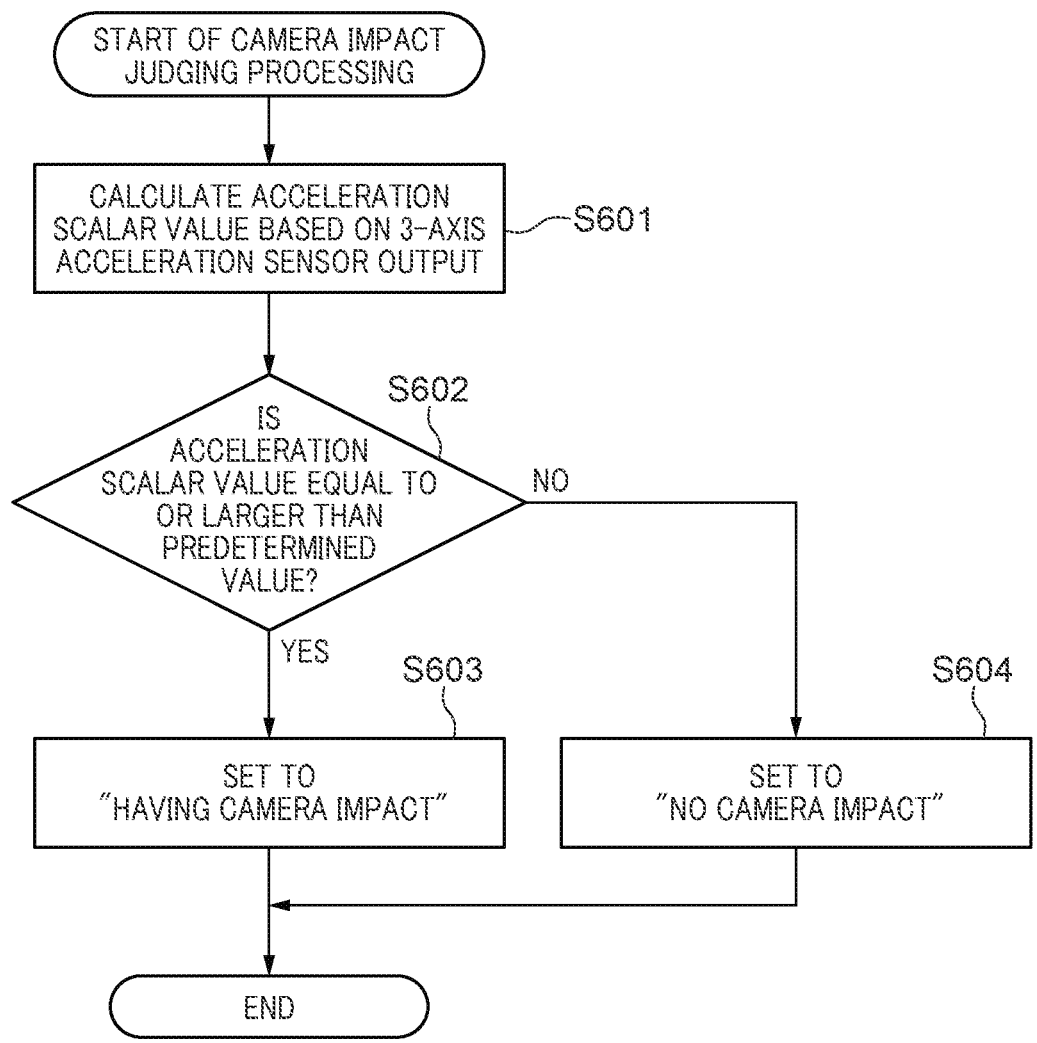
FIG. 6 is a flowchart that shows a camera impact judging processing.

In the step S503, the control unit 223, which functions as an impact detecting unit, executes a camera impact judging processing (FIG. 6). FIG. 6 is a flowchart that shows the camera impact judging processing, which is executed in the step S503.

At first, in a step S601, by using Expression 1, the control unit 223 calculates an absolute value of a value obtained by subtracting a gravity acceleration "ag" from a scalar quantity, which is calculated based on 3-axis acceleration output from the accelerometer 107, as an acceleration scalar value "as".

[Expression 1]

$$a_s = \left| \sqrt{a_x^2 + a_y^2 + a_z^2} - a_g \right| \quad (1)$$

In the case that the camera 101 falls down and is hit against a desk, since the acceleration scalar value "as" is a component of only an acceleration of the impact, from which the gravity acceleration is removed, it is possible to determine an impact force by the magnitude of the acceleration scalar value "as". In a step S602, the control unit 223 judges whether or not the acceleration scalar value "as" is equal to or larger than a predetermined value. In the case that the acceleration scalar value "as" is equal to or larger than the predetermined value, in a step S603, the control unit 223 sets a flag indicating that there was an impact to the camera (i.e., there was a camera impact), and simultaneously records that time point. On the other hand, in the case that the acceleration scalar value "as" is smaller than the predetermined value, in a step S604, the control unit 223 sets a flag indicating that there was no impact to the camera (i.e., there was no camera impact), and simultaneously records that time point. After the step S603 and the step S604, the control unit 223 ends the camera impact judging processing shown in FIG. 6, respectively.

In a step S504 of FIG. 5, the control unit 223 refers to the flag, which is set in the camera impact judging processing shown in FIG. 6, and judges whether or not there was an impact to the camera 101. In the case that there was no impact to the camera 101, the control unit 223 advances the processing to a step S506. On the other hand, in the case that there was an impact to the camera 101, in a step S505, the control unit 223 temporarily stops the control and energization of the pan and tilt rotating mechanism (the tilt rotating unit 104 and the pan rotating unit 105). This is because there is a possibility that the camera 101 has fallen down unintentionally and is hit against the desk or the like. After the step S505, the control unit 223 advances the processing to the step S506.

In the step S506, the control unit 223 judges whether or not a predetermined time has elapsed after it is judged in the step S504 that there was an impact to the camera 101. In the case that the predetermined time has not elapsed after it is judged in the step S504 that there was an impact to the camera 101, the control unit 223 advances the processing to a step S508. However, in the case that the predetermined time has elapsed after it is judged in the step S504 that there was an impact to the camera 101, in a step S507, the control unit 223 releases stopping the control and the energization of the pan and tilt rotating mechanism, returns drive control to an enabled state, and then, advances the processing to the step S508. Therefore, after it is judged in the step S504 that there was an impact to the camera 101, the stop of the pan and tilt rotating mechanism is maintained for at least the predetermined time.

In the step S508, the control unit 223 executes a rolling judging processing (that will be described later with reference to FIG. 7). Generally, in the case that the movable unit has a roundish shape, when the camera falls down sideways on the desk, it is easy to roll. In addition, in the case that the rotating mechanism is driven in the state that the camera has fallen down and the image stabilization control is applied, the rotating mechanism may not be properly driven to the target position due to the friction or the resistance with the installation surface, on which the camera has fallen down, and the driving force with high torque and high output may continue to be generated. In such a case, there is a risk that the rotating mechanism breaks down or power is wasted.

Figure 8:
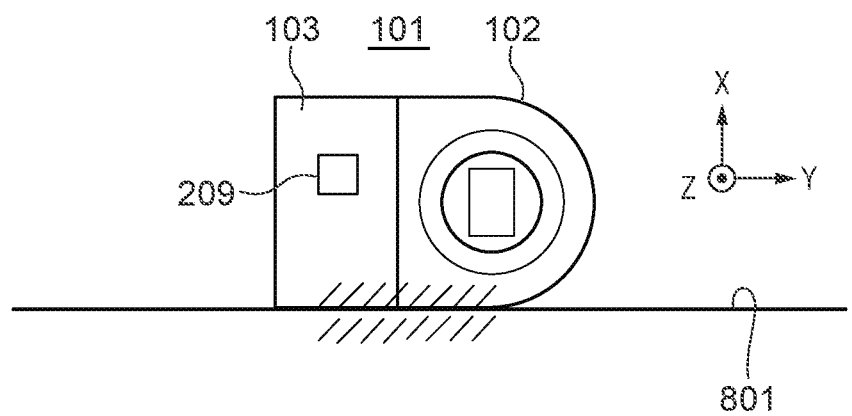
FIG. 8 is a diagram that shows the camera in a falling-down state.

For example, as shown in FIG. 8, consider a case that the camera 101, which has a circular cross-sectional shape and is orthogonal to the Y-axis, has fallen down on an installation surface 801. It is assumed that the pan and tilt rotating mechanism is driven in the state that the camera 101 has fallen down and the image stabilization control is applied. In this case, although the lens barrel 102 tries to pan-rotate, since a target control angle cannot be reached due to the influence of a frictional force with the installation surface 801, the control unit 223 controls to increase the driving force of pan rotation. As a result of increasing the driving force of the pan rotation, the fixed unit 103 rotates, and a large angular velocity is outputted from the angular velocity meter 106, thus, the angle target value is set to a larger value by the image stabilization control. However, the target position cannot be reached due to the influence of the frictional force with the installation surface 801, and a rotary drive amount becomes large, so that the rolling of the camera 101 will occur due to the movement of the pan rotating mechanism. Depending on an outer shape of the camera 101, there are cases that the rolling of the camera 101 is likely to occur and cases that the rolling of the camera 101 is not likely to occur, and there are directions, in which the rolling of the camera 101 is likely to occur and directions, in which the rolling of the camera 101 is not likely to occur.

Figure 7:
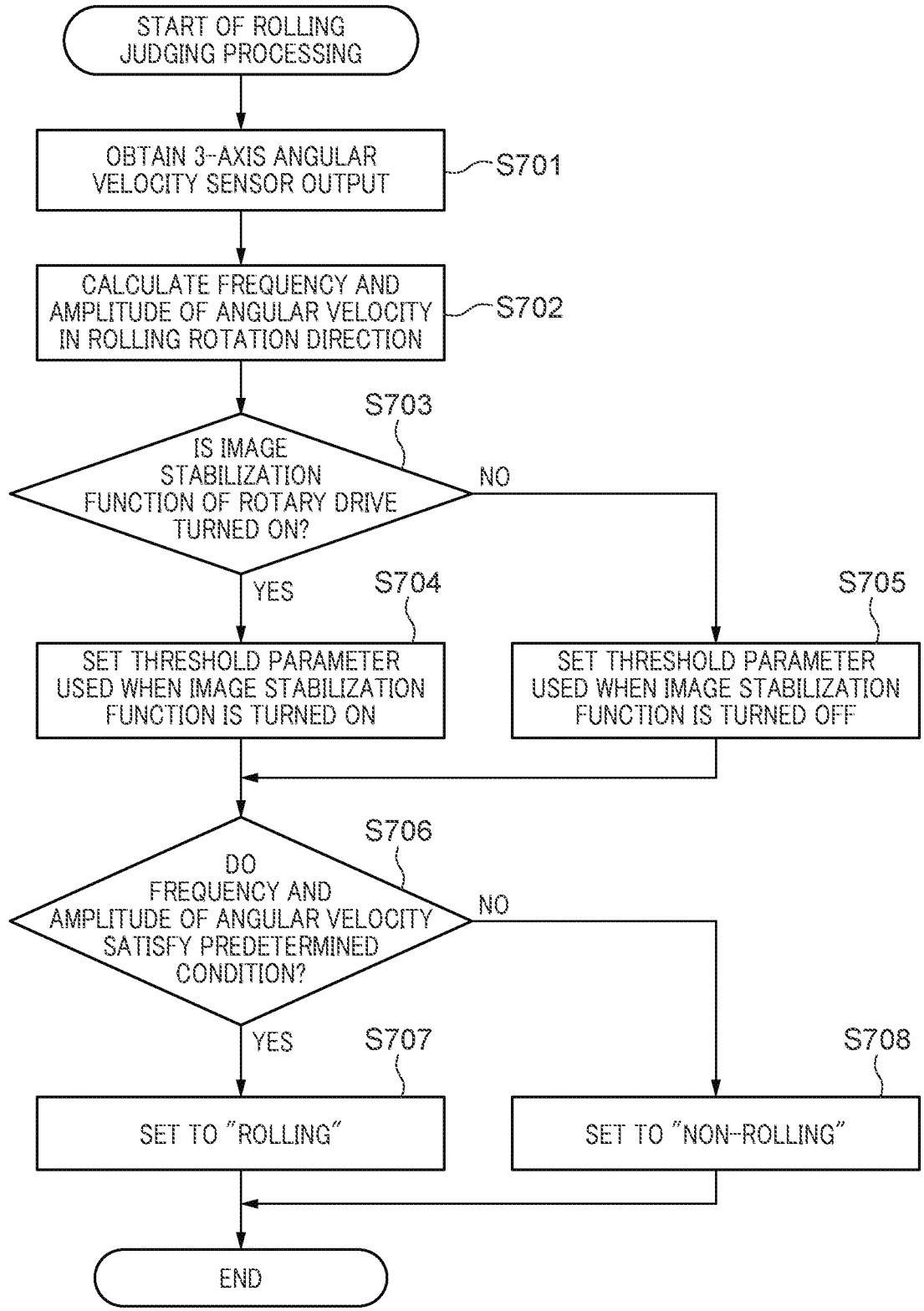
FIG. 7 is a flowchart that shows a rolling judging processing.

As described above, since the camera 101 may unintentionally roll due to the control of the pan and tilt rotating mechanism, in order to avoid the occurrence of a failure and wasteful power consumption, the control unit 223 performs the rolling judging processing (FIG. 7). The rolling judging processing judges whether it is "rolling" or "non-rolling".

In a step S509, based on a judgment result that is judged by the rolling judging processing, the control unit 223 judges whether or not the camera 101 is rolling. In the case that the judgment result of the rolling judging processing is the "rolling", it is judged to be a "rolling state". The "rolling" means that the camera 101 is rotating. Then, in the case of the "rolling", in a step S511, the control unit 223 sets the state variable "State" to the falling-down state, and advances the processing to a step S512.

In the step S512, in order to avoid problems such as falling down of the camera 101, a failure due to a high load on the rotating mechanism, and power consumption, as control at the time of falling down, the control unit 223 restricts the drive control and the energization of the pan and tilt rotating mechanism (the tilt rotating unit 104 and the pan rotating unit 105). In the present embodiment, although the drive control and the energization of the pan and tilt rotating mechanism are stopped, any one of a speed of the drive control, a drive range of the drive control, and an energization amount may be reduced. In a step S513, as the control at the time of falling down, the control unit 223 notifies that the camera 101 has fallen down and that the drive control of the pan and tilt rotating mechanism has been stopped. An example of this notification is shown in FIG. 9.

Figure 9:
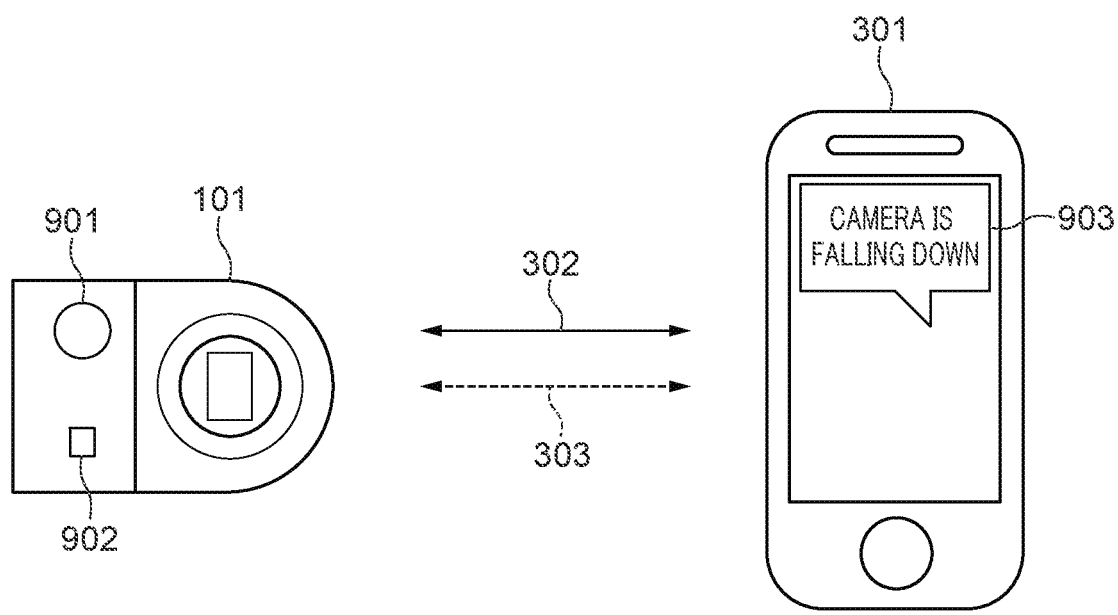
FIG. 9 is a diagram that shows a notification mode in the wireless communication system.

FIG. 9 is a diagram that shows a mode of notifying the smart device 301 in the wireless communication system. First, as a first notification, the control unit 223 outputs the predetermined lighting and blinking pattern from the LED 902 of the camera 101, and outputs a predetermined error notification sound from the speaker 901 of the camera 101. As a result, in the case that the user is near the camera 101, it is possible to immediately notify that the camera 101 has fallen down. Further, as a second notification, the control unit 223 notifies the smart device 301 of event information indicating that the camera 101 has fallen down by using the wireless LAN or the BLE, and displays the event information on a monitor provided in the smart device 301. For example, a message 903, which indicates that the camera is falling down, is displayed. As a result, even in the case that the user is not near the camera 101, if the user carries the smart device 301, it is possible for the user to immediately know that the camera 101 has fallen down. Moreover, the mode of notification is not limited to the examples, and either one may be used alone, or a plurality of combinations may be used. After the step S513, the control unit 223 ends the falling-down detection processing shown in FIG. 5.

As the result of judging in the step S509, in the case that the camera 101 is not rolling, in a step S510, the control unit 223 judges whether or not the camera 101 is stationary. For example, the control unit 223 compares signals of three axes of the angular velocity meter 106 with respective predetermined threshold values, and judges whether the camera 101 is stationary or moving according to the number of counts exceeding the predetermined threshold value within a predetermined time or the number of counts less than the predetermined threshold value within the predetermined time. Alternatively, the control unit 223 may judge whether or not the camera 101 is stationary based on signals of the accelerometer 107. Further, the control unit 223 may judge whether or not the camera 101 is stationary based on signals obtained by extracting a specific frequency with a filter such as an HPF (high-pass filter).

This judgment is performed to distinguish whether the camera 101 is stationary on the desk or the like, or the camera 101 is in a state that the camera 101 is moving with the user such as the hand-held state and a wearable state. Since it is judged in the step S502 that the camera 101 is inclined, in the case that it is judged in the step S510 that the camera 101 is stationary, and there is a possibility that the camera 101 remains unintentionally fallen down on the desk or the like. Thus, in this case, the control unit 223 advances the processing to the step S511. Therefore, even if the rolling is settled, when the camera 101 is stationary while being inclined, the state variable "State" is set to the falling-down state.

On the other hand, in the case that it is judged in the step S510 that the camera 101 is not stationary, since the camera 101 is neither rolling nor stationary, it is possible to estimate that the camera 101 is in the hand-held state or the wearable state. Therefore, the control unit 223 ends the falling-down detection processing shown in FIG. 5 without updating the state variable "State".

Therefore, in the case that the camera 101 is not stationary, the state variable "State" remains in the non-falling-down state. The reason for doing this is next. At first, in general, in the case of photographing while operating the camera in the hand-held state, when an operation of frequently stopping the rotating mechanism occurs, in some cases, it is not possible to correctly perform the automatic search, the tracking, and the image stabilization control. In addition, when the camera angle changes significantly in the hand-held state, frequent notifications such as sound may cause discomfort. Therefore, it is better to stop the drive of the pan and tilt rotating mechanism when the camera has fallen down on the desk or the like, but on the other hand, it is considered better not to stop the drive of the pan and tilt rotating mechanism when the camera is in the hand-held state.

After the state variable "State" is set to the falling-down state in the step S511, the processing shifts from the step S501 to the step S514. In the step S514, the control unit 223 judges whether or not the inclination angle of the camera 101 is smaller than a predetermined value B (a second inclination angle). Further, the predetermined value B is larger than 0 degrees, and the predetermined value B is smaller than the predetermined value A. For example, the predetermined value B is 20 degrees.

In the case that the inclination angle of the camera 101 is smaller than the predetermined value B, it is highly possible that the camera 101 has been corrected from the falling-down state to a normal position by the user. Therefore, in a step S516, the control unit 223 sets the state variable "State" to the non-falling-down state. In a step S517, the control unit 223 releases the stop of the drive control and the energization of the pan and tilt rotating mechanism (the tilt rotating unit 104 and the pan rotating unit 105). That is, the control unit 223 enables the drive control of the pan and tilt rotating mechanism and restarts it. After that, the control unit 223 ends the falling-down detection processing shown in FIG. 5.

On the other hand, in the case that the inclination angle of the camera 101 is not smaller than the predetermined value B, since it can be judged that the falling-down state of the camera 101 is continued, the control unit 223 advances the processing to a step S515. In the step S515, the control unit 223 judges whether or not the subject to be photographed has been detected within the angle of view of the camera 101. That is, the control unit 223 judges whether or not the subject, which is set as a photographing target, could be detected from a photographed image.

As a result of this judging, in the case that the subject has been detected within the angle of view of the camera 101, it is highly possible that the user intentionally inclines the camera 101 for installation. For example, it is conceivable that the camera 101 is intentionally installed downward in order to photograph a baby on a crib. Therefore, in this case, in the step S516, the control unit 223 sets the state variable "State" to the non-falling-down state. However, in the case that the subject has not been detected within the angle of view of the camera 101, since it can be judged that the falling-down state of the camera 101 is continued, the control unit 223 ends the falling-down detection processing shown in FIG. 5.

FIG. 7 is a flowchart that shows the rolling judging processing executed in the step S508 of FIG. 5. In a step S701, the control unit 223 obtains 3-axis angular velocity sensor output of the angular velocity meter 106, and then in a step S702, the control unit 223 calculates a frequency and an amplitude of an angular velocity in a predetermined direction. The predetermined direction is a rolling rotation direction, which corresponds to a drive direction of the tilt rotating unit 104 by the lens barrel rotary drive unit 205 and a drive direction of the pan rotating unit 105 by the lens barrel rotary drive unit 205, and is predetermined according to the outer shape of the camera 101. For example, a direction most easily rotated is set as the predetermined direction. For example, in the case that the lens barrel 102 has a shape that easily rotates in the yaw direction, the predetermined direction is a yaw rotation direction.

The control unit 223 calculates the frequency and the amplitude in each direction by an FFT (Fast Fourier Transform), which uses an angular velocity value of a predetermined period as an input value. Further, the control unit 223 calculates a yaw angular velocity, a pitch angular velocity, and a roll angular velocity. As for the calculation of the amplitude and the frequency, a method of calculating the amplitude and the frequency by a simple processing with a shortened processing time as described below may be adopted.

Figure 10:
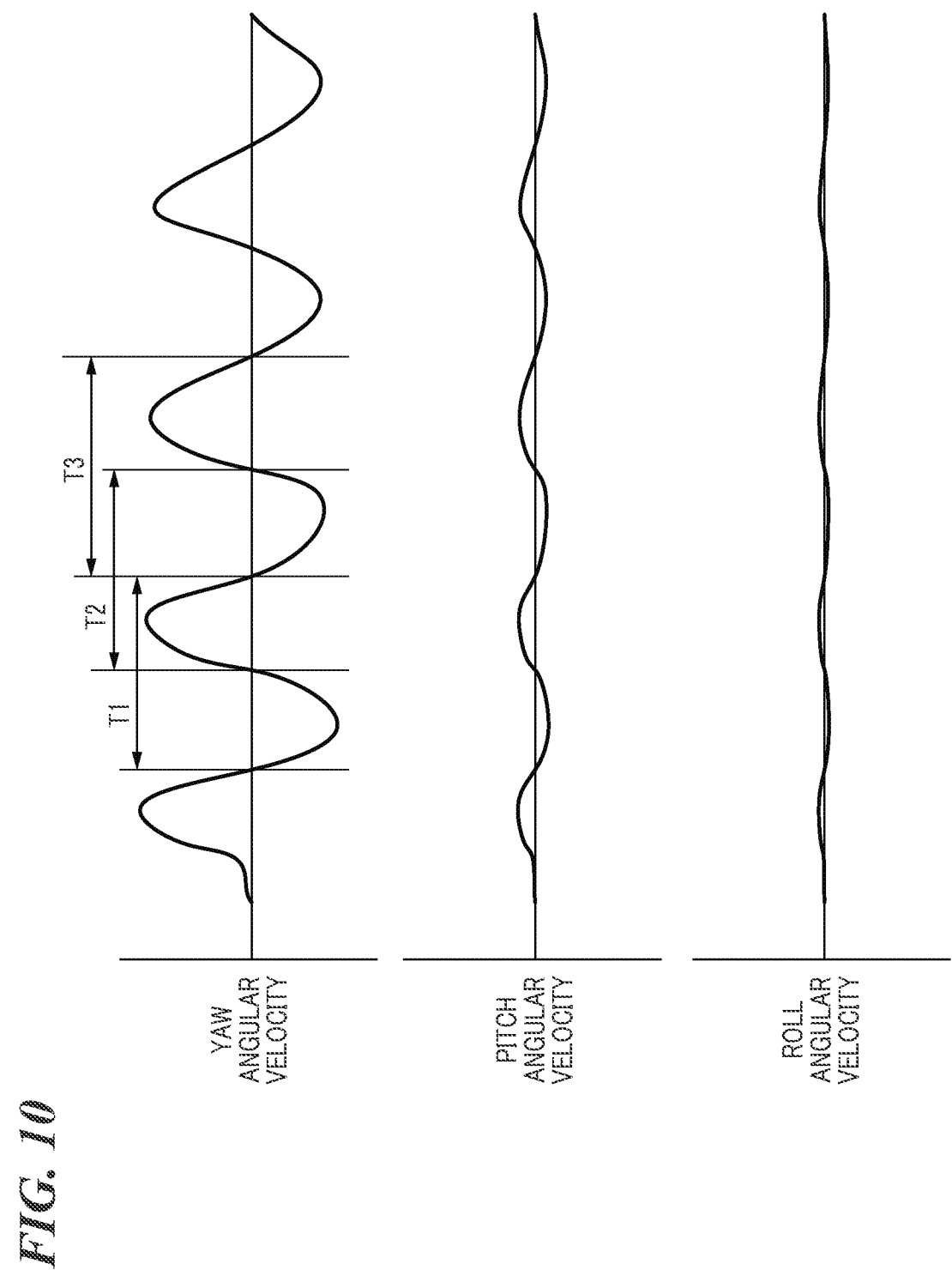
FIG. 10 is a drawing that shows three graphs, which show respective shake amounts in three axial directions when the camera is rolling.

FIG. 10 is a drawing that shows three graphs, which show respective shake amounts in three axial directions when the camera 101 is rolling. The control unit 223 measures periods T1, T2, and T3 corresponding to one cycle with respect to the yaw angular velocity with reference to sign inversion timings (a timing from + to −, a timing from − to +), and calculates the frequency from these. Further, the control unit 223 stores the peak value of the yaw angular velocity during the periods T1, T2, and T3 as the amplitude corresponding to each period. Further, the control unit 223 performs the same processing with respect to each of the pitch angular velocity and the roll angular velocity.

Next, in a step S703, the control unit 223 judges whether or not an image stabilization function of rotary drive is in an ON state (enabled). Conditions, under which the image stabilization function is turned ON/OFF, will be described. First, in the case that temporary stop of the rotating mechanism is not performed because it is not judged in the step S504 that there was an impact to the camera 101, the image stabilization function is set to the ON state. Further, in the case that the temporary stop of the rotating mechanism is released in the step S507 after it is judged that there was an impact to the camera 101, when the output of the angular velocity meter 106 is large to some extent and it is judged that there is the camera shake, the image stabilization control is set to the ON state.

On the other hand, in the case that the temporary stop of the rotating mechanism in the step S505 continues, the image stabilization control is set to an OFF state. Further, even if the rotating mechanism is not in a stopped state, when the output of the angular velocity meter 106 is very small and it is judged that the camera is stationary, the image stabilization control is set to the OFF state.

As a result of judging in the step S703, in the case that the image stabilization control is in the ON state, the control unit 223 advances the processing to a step S704, and on the other hand, in the case that the image stabilization control is in the OFF state (disabled), the control unit 223 advances the processing to a step S705. In the step S704, as a threshold parameter for performing a rolling judging, the control unit 223 sets a parameter used when the image stabilization function is in the ON state, and then, the control unit 223 advances the processing to a step S706. In the step S705, as the threshold parameter, the control unit 223 sets a parameter used when the image stabilization function is in the OFF state, and then, the control unit 223 advances the processing to the step S706. The parameter used when the image stabilization function is in the ON state and the parameter used when the image stabilization function is in the OFF state are stored in the nonvolatile memory 216 in advance.

Since the rolling characteristics of the camera 101 differ depending on whether the image stabilization function is in the ON state or the OFF state, the threshold parameter used when the image stabilization function is in the ON state is distinguished from the threshold parameter used when the image stabilization function is in the OFF state. In the case that the image stabilization function is in the OFF state (energization OFF), the shake amount is determined by the shape of the camera 101, and in most cases, the shake amount of rolling is small. However, in the case that the image stabilization function is in the ON state (energization ON), due to the malfunction of the image stabilization control due to the influence of the frictional force, the shake amount of rolling may become very large.

In the step S706, the control unit 223 judges whether or not the amplitude and the frequency of the angular velocity, which are calculated in the step S702, satisfy a predetermined condition described later. As a result of judging in the step S706, in the case that the amplitude and the frequency of the angular velocity satisfy the predetermined condition, in a step S707, the control unit 223 sets the judgment result of the rolling judging processing to the "rolling". On the other hand, in the case that the amplitude and the frequency of the angular velocity do not satisfy the predetermined condition, in a step S708, the control unit 223 sets the judgment result of the rolling judging processing to the "non-rolling". After the step S707 and the step S708, the control unit 223 ends the rolling judging processing shown in FIG. 7, respectively.

A method for judging in the step S706 whether or not the amplitude and the frequency of the angular velocity satisfy the predetermined condition will be described. The control unit 223 judges whether or not the camera 101 is rolling on the basis of respective amplitudes and respective frequencies of the pitch angular velocity, the yaw angular velocity, and the roll angular velocity, which are calculated in the step S702.

First, as shown in FIG. 8, it is assumed that the fixed unit 103 has a cylindrical shape, and both the lens barrel 102 and the fixed unit 103, which are orthogonal to the Y-axis, have a circular cross-sectional shape. In this case, an axis, which is greatly influenced when the camera 101 is rolling, is the Y-axis, and the shake amount in the yaw rotation direction around the Y-axis becomes large. Further, since the yaw rotation direction and the drive direction of the pan direction by the rotating mechanism match, when the image stabilization control in the pan direction is performed in the falling-down state shown in FIG. 8, due to the malfunction of the image stabilization control due to the influence of the frictional described above, the shake amount in the yaw rotation direction will become very large.

At this time, as compared with the yaw rotation direction, the shake amount of rolling in a pitch rotation direction and the shake amount of rolling in a roll rotation direction are very small. Further, a frequency band (a frequency range) at the time of rolling is determined by the shape of the camera, the weight of the camera, and the like, and if the lens barrel 102, which is the movable unit, is heavy, a rolling frequency will be on the low frequency side. Therefore, the control unit 223 compares the magnitude of the amplitude of the yaw angular velocity in a specific frequency range (for example, 1 to 3 Hz) (hereinafter referred to as "the former") with the magnitude of the amplitude of the yaw angular velocity in a frequency range other than the specific frequency range (hereinafter referred to as "the latter"). Then, in the case that a difference between the former and the latter exceeds a first predetermined difference, and an amplitude difference between the pitch angular velocity and the yaw angular velocity or an amplitude difference between the roll angular velocity and the yaw angular velocity exceeds a second predetermined difference, the control unit 223 can judge that the camera 101 is rolling.

If the amplitude difference of the yaw angular velocity between the specific frequency range and the frequency range other than the specific frequency range is small, since there is a high possibility that the camera 101 is in a shaking state such as the hand-held state, the control unit 223 can judge that the camera 101 is not rolling. Further, if the amplitude difference between the pitch angular velocity and the yaw angular velocity or the amplitude difference between the roll angular velocity and the yaw angular velocity is small, since there is a high possibility that the camera 101 is in a shaking state such as the hand-held state, the control unit 223 can judge that the camera 101 is not rolling. Moreover, parameters such as the specific frequency range, the first predetermined difference, and the second predetermined difference are included in the threshold parameters set in the step S704 and the step S705. Therefore, these parameters may differ between when the image stabilization function is in the ON state and when the image stabilization function is in the OFF state.

These can be summarized as follows. "A first condition" is that a difference between the amplitude of the angular velocity in the predetermined direction (here, the yaw rotation direction) in the specific frequency range (a first frequency band) and the amplitude of the angular velocity in the predetermined direction in a frequency band other than the specific frequency range (other than the first frequency band) exceeds the first predetermined difference. "A second condition" is that a difference between the amplitude of the angular velocity in the predetermined direction and the amplitude of the angular velocity in a direction different from the predetermined direction (here, the pitch rotation direction, the roll rotation direction) exceeds the second predetermined difference. When both the first condition and the second condition are satisfied, the above-mentioned predetermined condition is satisfied, and it is judged that the camera 101 is rolling. Moreover, the amplitude used for comparison may be the maximum value or the average value.

In addition, another rolling judging method may be adopted.

In the case that a frequency with the highest amplitude detected within a predetermined time at the yaw angular velocity is within the specific frequency range (for example, 1 to 3 Hz) and the highest amplitude exceeds a first predetermined value, and each amplitude of the pitch angular velocity and the roll angular velocity is less than a second predetermined value, it may be judged that the camera 101 is rolling. Moreover, parameters such as the specific frequency range, the first predetermined value, and the second predetermined value are included in the threshold parameters set in the step S704 and the step S705. Therefore, these parameters may differ between when the image stabilization function is in the ON state and when the image stabilization function is in the OFF state.

These can be summarized as follows. "A third condition" is that the amplitude of the angular velocity in the predetermined direction (here, the yaw rotation direction) shows a maximum value in the first frequency band, and the maximum value exceeds the first predetermined value. "A fourth condition" is that each amplitude of the angular velocity in the direction different from the predetermined direction (here, the pitch rotation direction, the roll rotation direction) is less than the second predetermined value. When both the third condition and the fourth condition are satisfied, the above-mentioned predetermined condition is satisfied, and it is judged that the camera 101 is rolling. Moreover, the amplitude used in the fourth condition may be the maximum value or the average value.

Figure 11:
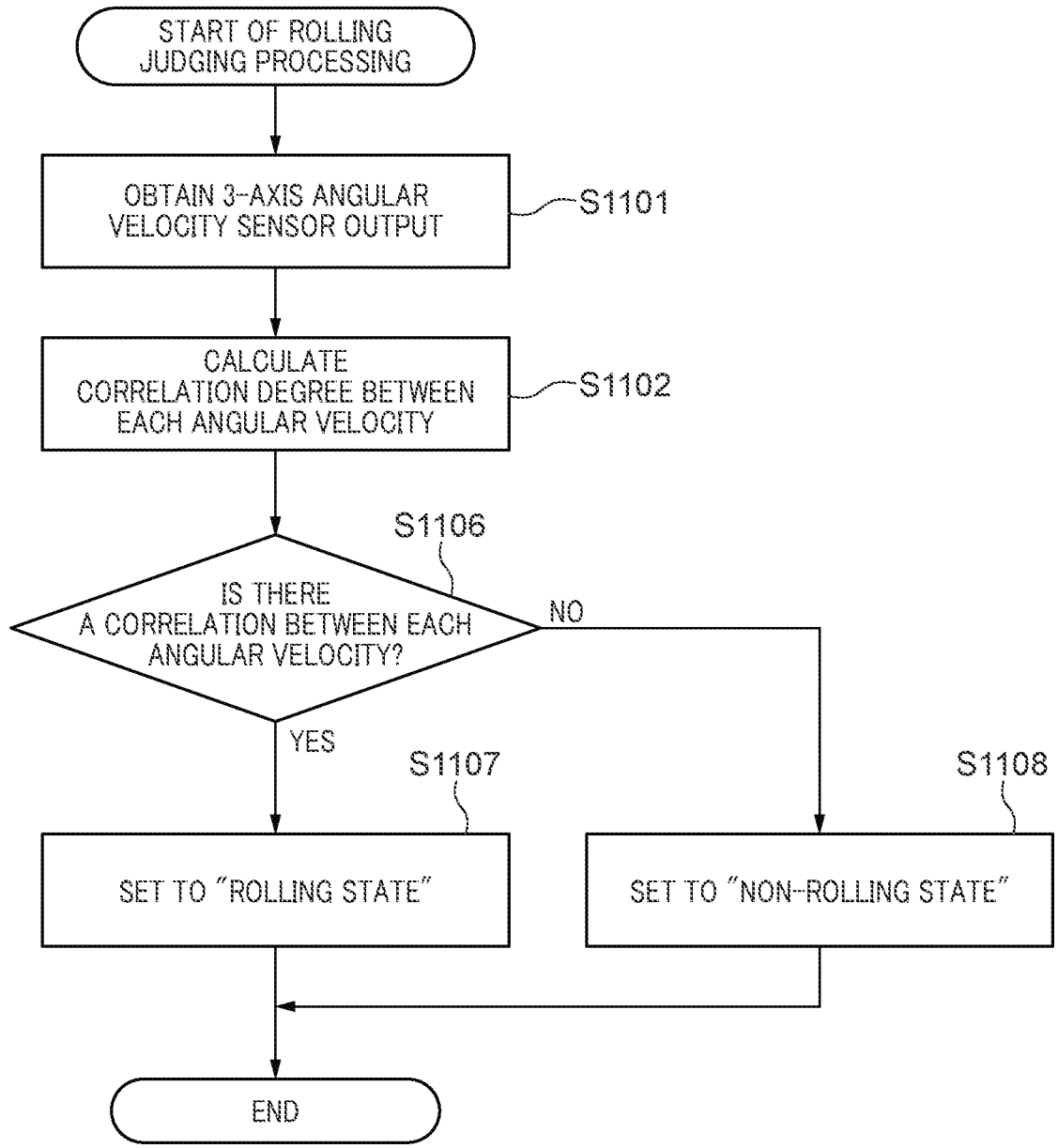
FIG. 11 is a flowchart that shows a rolling judging processing.

Further, instead of the method shown in FIG. 7, another rolling judging method shown in FIG. 11 may be adopted. FIG. 11 is a flowchart that shows the rolling judging processing executed in the step S508 of FIG. 5.

In a step S1101, the control unit 223 obtains 3-axis angular velocity sensor output of the angular velocity meter 106. In a step S1102, the control unit 223 calculates a correlation degree between each angular velocity (between the angular velocities). There is a plurality of possible methods for calculating the correlation degree, but first, a first correlation degree calculation method will be described.

The first correlation degree calculation method is a method that uses coherence, which is a correlation value of the frequency domain. The control unit 223 performs Fourier transform with respect to time-series data of the angular velocity of each axis shown in FIG. 10, calculates a power spectrum, and calculates the coherence based on Expression 2.

[Expression 2]

$$Coh(f) = \frac{\left|\frac{1}{N} X(f) \cdot Y^*(f)\right|}{\sqrt{\frac{1}{N} X(f) \cdot X^*(f)} \sqrt{\frac{1}{N} Y(f) \cdot Y^*(f)}} \quad (2)$$

In Expression 2, f is the frequency, and N is the number of frequency samples. X(f) and Y(f) are Fourier transforms of time-series data xi and yi of the pitch angular velocity and the yaw angular velocity, respectively. X*(f) and Y*(f) are complex conjugates of X(f) and Y(f), respectively. Coh represents the coherence. The control unit 223 calculates the coherence for several frequencies f set in the vicinity of the specific frequency range (for example, 1 to 3 Hz).

In the case that the rolling direction and the yaw direction by the angular velocity meter do not completely match, the same rolling rotation will occur at the angular velocity in the pitch direction and the angular velocity in the roll direction. Therefore, the control unit 223 obtains the coherence of the yaw angular velocity and the pitch angular velocity, and the coherence of the yaw angular velocity and the roll angular velocity, respectively, and judges whether or not the camera 101 is rolling depending on whether or not there is a phase correlation.

In a step S1106, the control unit 223 judges whether or not there is a correlation between each angular velocity. That is, in the case that the coherence in the specific frequency range is larger than a coherence threshold value, the control unit 223 judges that there is a correlation with the rotation due to the rolling effect, that is, judges that there is a correlation between each angular velocity. On the other hand, in the case that the coherence is equal to or less than the coherence threshold value, the control unit 223 judges that there is no correlation with the rotation due to the rolling effect, that is, judges that there is no correlation between each angular velocity. As a result of judging in the step S1106, in the case that there is a correlation between each angular velocity, in a step S1107, the control unit 223 executes the same processing as in the step S707, and ends the rolling judging processing shown in FIG. 11. In the case that there is no correlation between each angular velocity, in a step S1108, the control unit 223 executes the same processing as in the step S708, and ends the rolling judging processing shown in FIG. 11.

The method, which judges whether or not there is a correlation between each angular velocity, can be summarized as follows. "A fifth condition" is that a correlation degree between the angular velocity in the predetermined direction (here, the yaw rotation direction) and the angular velocity in the direction different from the predetermined direction (here, the pitch rotation direction, the roll rotation direction) exceeds a predetermined correlation degree. If the coherence in the specific frequency range is larger than the coherence threshold value, the fifth condition will be satisfied. When the fifth condition is satisfied, the above-mentioned predetermined condition is satisfied, and it is judged that the camera 101 is rolling.

Next, a second correlation degree calculation method will be described. The second correlation degree calculation method is a method of calculating by the simple processing with a shortened processing time.

As shown in FIG. 10, in the case that a deviation of the sign inversion timing between the yaw angular velocity and the pitch angular velocity is within a permissible value and each of the periods T1, T2, and T3 is within a permissible value, the control unit 223 may judge that there is a phase correlation. In this case as well, when the fifth condition is satisfied, the above-mentioned predetermined condition is satisfied.

Alternatively, the control unit 223 may always calculate a mutual correlation coefficient in the predetermined period by using Expression 3, obtain the correlation value, and judge the presence or absence of the correlation.

[Expression 3]

$$Rxy = \frac{\frac{1}{N} \sum_i^N x_i y_i}{\sqrt{\frac{1}{N} \sum_i^N x_i^2} \sqrt{\frac{1}{N} \sum_i^N y_i^2}} \quad (3)$$

In Expression 3, Xi and Yi are time-series data of the pitch angular velocity and the yaw angular velocity, respectively. Rxy represents a mutual correlation coefficient of the time-series data Xi and Yi. The control unit 223 calculates a mutual correlation coefficient of the roll angular velocity and the yaw angular velocity in the same manner. If the correlation value is larger than a predetermined value, the fifth condition will be satisfied. When the fifth condition is satisfied, the above-mentioned predetermined condition is satisfied, and it is judged that the camera 101 is rolling.

Moreover, the above first to fifth conditions may be applied in combination as appropriate as long as there is no contradiction. For example, when both the first condition and the fifth condition are satisfied, the above-mentioned predetermined condition is satisfied, and it may be judged that the camera 101 is rolling. Alternatively, when both the second condition and the fifth condition are satisfied, the above-mentioned predetermined condition is satisfied, and it may be judged that the camera 101 is rolling.

According to the present embodiment, in the case of being judged that the state of the camera 101 is the falling-down state during the drive control of the lens barrel rotary drive unit 205, the control unit 223 stops the drive control of the lens barrel rotary drive unit 205. This makes it possible to judge that the apparatus has fallen down unintentionally. Further, in the case that the camera 101 has fallen down unintentionally, the drive control can be stopped to avoid the occurrence of the failure due to the malfunction or the like and the wasteful power consumption.

In particular, when it is judged that the camera 101 is rolling in the state that the inclination angle of the camera 101 is larger than the predetermined value A (the first inclination angle), it is judged that the state of the camera 101 is the falling-down state (the step S509). As a result, it is possible to prevent the rolling from continuing while the target position cannot be reached.

Further, in the case that the inclination angle of the camera 101 exceeds the predetermined value A and it is judged that the camera 101 is stationary, it is judged that the state of the camera 101 is the falling-down state (the step S510). As a result, it is possible to prevent the drive control of the lens barrel rotary drive unit 205 from being continued while the camera 101 remains fallen down, and it is possible to suppress the occurrence of the failure and power consumption.

On the other hand, even in the case that the inclination angle of the camera 101 exceeds the predetermined value A and the camera 101 is not rolling, when it is judged that the camera 101 is not stationary, it is not judged that the state of the camera 101 is the falling-down state (the step S510). Therefore, even in the case that the camera 101 is inclined, since the drive control of the lens barrel rotary drive unit 205 is continued in the hand-held state or the wearable state, the usability is favorable.

Further, in the case that the state of the camera 101 changes from the falling-down state to the non-falling-down state after stopping the drive control of the lens barrel rotary drive unit 205, the control unit 223 releases the stop of the drive control of the lens barrel rotary drive unit 205 (the step S517). As a result, if the conditions are right, since the drive control is automatically restarted without the user performing the drive control restart operation, it is possible to improve the usability.

For example, when the inclination angle of the camera 101 is smaller than the predetermined value B after the state of the camera 101 became the falling-down state, the state of the camera 101 is switched from the falling-down state to the non-falling-down state (the step S514). As a result, in the case that the user restored the camera 101 to the normal position, it is possible to automatically release the stop of the drive control. Further, for example, after the state of the camera 101 became the falling-down state, if a predetermined subject is detected in the photographed image, the state of the camera 101 is switched from the falling-down state to the non-falling-down state (the step S515). As a result, in the case that the user intentionally inclines the camera 101, it is possible to automatically release the stop of the drive control.

Moreover, in the case that the inclination angle of the camera 101 exceeds the predetermined value A and an impact is detected, regardless of whether the camera 101 is in the falling-down state or the non-falling-down state, the drive control of the lens barrel rotary drive unit 205 is stopped for a certain period of time (the step S504, the step S505). However, the comparison value of the inclination angle of the camera 101 in this case is not limited to the predetermined value A, and may be a third inclination angle, which is different from the predetermined value A. Further, the processing, which temporarily stops the drive control of the lens barrel rotary drive unit 205 when an impact is detected, may be provided immediately before the step S501, between the step S501 and the step S502, or between the step S501 and the step S514. Moreover, the processing, which temporarily stops the drive control of the lens barrel rotary drive unit 205 when an impact is detected, is optional.

Moreover, in the present embodiment, the camera 101 is an image pickup apparatus having two rotation axes, but may be an image pickup apparatus having at least one rotation axis. Further, in the present embodiment, the relative displacement of the movable unit with respect to the fixed unit is a rotational displacement, but the relative displacement of the movable unit with respect to the fixed unit may be a linear displacement. That is, the present invention is not limited to the rotating mechanism, and can be applied to a moving mechanism that moves in a linear direction.

Further, in the present embodiment, in order to judge whether the state of the image pickup apparatus is the falling-down state or the non-falling-down state, although various kinds of information are used, the judgment may be performed based on at least the tilt information and the angular velocity information of the image pickup apparatus, and the processing based on other information may be omitted. Further, the stop processing of the rotating mechanism and the falling-down notification processing, which are performed in the case of being judged that the state of the image pickup apparatus is the falling-down state, may be omitted. Furthermore, if having a mechanism that automatically restores from the falling-down state to the normal position, in the case of being judged that the state of the image pickup apparatus is the falling-down state, a restoring processing may be executed. Further, the method described in the present embodiment, which judges whether the state of the apparatus is the falling-down state or the non-falling-down state, can be applied to any apparatuses other than the image pickup apparatus, as long as the apparatus is an electronic apparatus having an angular velocity meter and an accelerometer, in which a movable unit can be displaced relatively to a fixed unit by a driving means (a drive unit).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-198082, filed Nov. 30, 2020, which is hereby incorporated by reference herein in its entirety.

What is claimed is:

1. An image pickup apparatus comprising:
   a movable unit including an image pickup unit;
   a base configured to support the movable unit in a manner being relatively displaceable;
   a driver configured to drive the movable unit so as to be displaced relatively to the base;
   a first detector configured to detect an inclination angle of the image pickup apparatus;
   a second detector configured to detect movement of the image pickup apparatus; and
   at least one processor or circuit configured to function as:
      a control unit configured to perform control at the time of falling down of the image pickup apparatus in accordance with the inclination angle detected by first detector and frequency information and amplitude information of the movement detected by the second detector, wherein in a case that the inclination angle of the image pickup apparatus exceeds a first inclination angle and the image pickup apparatus is rolling, the control unit performs the control at the time of falling down, and wherein in a case that the inclination angle of the image pickup apparatus exceeds the first inclination angle, and the image pickup apparatus is not rolling and is not stationary, the control unit does not perform the control at the time of falling down.

2. The image pickup apparatus according to claim 1 wherein in a case that a state of the image pickup apparatus became a falling-down state during the drive control of the driver, the control unit stops the drive control of the driver as the control at the time of falling down.

3. The image pickup apparatus according to claim 2, wherein in a case that the state of the image pickup apparatus changes from the falling-down state to a non-falling-down state after stopping the drive control of the driver, the control unit releases stop of the drive control of the driver.

4. The image pickup apparatus according to claim 1, wherein the control unit notifies that the image pickup apparatus is in a falling-down state as the control at the time of falling down.

5. The image pickup apparatus according to claim 1, wherein in a case that the inclination angle of the image pickup apparatus is less than a second inclination angle, which is smaller than the first inclination angle, after a state of the image pickup apparatus became a falling-down state, the control unit ends the control at the time of falling down.

6. The image pickup apparatus according to claim 1, wherein the at least one processor or circuit is configured to function as a subject detecting unit configured to detect a subject, which is set as a photographing target, from an image photographed by the image pickup unit, and wherein in a case that the subject is detected after a state of the image pickup apparatus became a falling-down state, the control unit ends the control at the time of falling down.

7. The image pickup apparatus according to claim 1, wherein in a case that a difference between an amplitude of an angular velocity in a predetermined direction corresponding to a drive direction by the driver in a first frequency band and an amplitude of an angular velocity in the predetermined direction in a frequency band other than the first frequency band exceeds a first predetermined difference, and a difference between the amplitude of the angular velocity in the predetermined direction and an amplitude of an angular velocity in a direction different from the predetermined direction exceeds a second predetermined difference, the control unit performs the control at the time of falling down.

8. The image pickup apparatus according to claim 1, wherein in a case that an amplitude of an angular velocity in a predetermined direction corresponding to a drive direction by the driver shows a maximum value in a first frequency band, and the maximum value exceeds a first predetermined value, and an amplitude of an angular velocity in a direction different from the predetermined direction is less than a second predetermined value, the control unit performs the control at the time of falling down.

9. The image pickup apparatus according to claim 1, wherein in a case that a correlation degree between an angular velocity in a predetermined direction corresponding to a drive direction by the driver and an angular velocity in a direction different from the predetermined direction exceeds a predetermined correlation degree, the control unit performs the control at the time of falling down.

10. The image pickup apparatus according to claim 1, wherein in a case that a correlation degree between an angular velocity in a predetermined direction corresponding to a drive direction by the driver and an angular velocity in a direction different from the predetermined direction exceeds a predetermined correlation degree, and a difference between an amplitude of the angular velocity in the predetermined direction in a first frequency band and an amplitude of the angular velocity in the predetermined direction in a frequency band other than the first frequency band exceeds a first predetermined difference, the control unit performs the control at the time of falling down.

11. The image pickup apparatus according to claim 1, wherein in a case that a correlation degree between an angular velocity in a predetermined direction corresponding to a drive direction by the driver and an angular velocity in a direction different from the predetermined direction exceeds a predetermined correlation degree, and a difference between an amplitude of the angular velocity in the predetermined direction and an amplitude of the angular velocity in the direction different from the predetermined direction exceeds a second predetermined difference, the control unit performs the control at the time of falling down.

12. The image pickup apparatus according to claim 7, wherein the shape of a cross-section parallel to the drive direction of the image pickup apparatus, is circular.

13. The image pickup apparatus according to claim 1, wherein the at least one processor or circuit is configured to function as an impact detecting unit configured to detect an impact on the image pickup apparatus, and wherein in a case that the inclination angle of the image pickup apparatus exceeds a third inclination angle, and the impact on the image pickup apparatus is detected, the control unit stops drive control of the driver for a certain period of time as the control at the time of falling down.

14. The image pickup apparatus according to claim 1, wherein a relative displacement of the movable unit with respect to the base is a rotational displacement.

15. The image pickup apparatus according to claim 1, wherein the first detector and the second detector are provided on the base.

16. A control method for an image pickup apparatus that comprises
a movable unit including an image pickup unit;
a base configured to support the movable unit in a manner being relatively displaceable;
a driver configured to drive the movable unit so as to be displaced relatively to the base;

a first detector configured to detect an inclination angle of the image pickup apparatus; and a second detector configured to detect movement of the image pickup apparatus, the control method comprising:

a step of performing control at the time of falling down of the image pickup apparatus in accordance with the inclination angle detected by first detector and frequency information and amplitude information of the movement detected by the second detector, wherein the control at the time of falling down is performed in a case that the inclination angle of the image pickup apparatus exceeds a first inclination angle and the image pickup apparatus is rolling, and wherein the control at the time of falling down is not performed in a case that the inclination angle of the image pickup apparatus exceeds the first inclination angle, and the image pickup apparatus is not rolling and is not stationary.

* * * * *